United States Patent
Chavan

(10) Patent No.: US 11,465,016 B1
(45) Date of Patent: Oct. 11, 2022

(54) PROCESS FOR INCORPORATING NANOFILLER MASTERBATCH INTO A CORE OF A GOLF BALL

(71) Applicant: Callaway Golf Company, Carlsbad, CA (US)

(72) Inventor: Vijay Chavan, Oceanside, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 17/485,875

(22) Filed: Sep. 27, 2021

Related U.S. Application Data

(63) Continuation of application No. 17/110,661, filed on Dec. 3, 2020, now Pat. No. 11,185,743, which is a continuation-in-part of application No. 17/090,754, filed on Nov. 5, 2020, now Pat. No. 11,148,012, which is a continuation of application No. 16/703,728, filed on Dec. 4, 2019, now Pat. No. 10,828,535, which is a continuation of application No. 16/403,203, filed on May 3, 2019, now Pat. No. 10,500,446, which is a continuation of application No. 16/105,125, filed on Aug. 20, 2018, now Pat. No. 10,279,220, which is a continuation of application No. 15/782,666, filed on Oct. 12, 2017, now Pat. No. 10,052,524, which is a continuation-in-part of application No. 15/705,011, filed on Sep. 14, 2017, now Pat. No. 10,039,959, which is a continuation-in-part of application No. 15/436,169, filed on Feb. 17, 2017, now Pat. No. 9,789,366.

(Continued)

(51) Int. Cl.
| | | |
|---|---|---|
| *A63B 37/06* | (2006.01) | |
| *A63B 37/00* | (2006.01) | |
| *C08K 3/04* | (2006.01) | |
| *C08K 5/098* | (2006.01) | |
| *C08L 9/00* | (2006.01) | |
| *A63B 45/00* | (2006.01) | |
| *C08K 3/22* | (2006.01) | |
| *C08K 5/14* | (2006.01) | |

(52) U.S. Cl.
CPC ...... *A63B 37/0051* (2013.01); *A63B 37/0031* (2013.01); *A63B 37/0043* (2013.01); *A63B 37/0045* (2013.01); *A63B 37/0054* (2013.01); *A63B 37/0062* (2013.01); *A63B 37/0064* (2013.01); *A63B 37/0074* (2013.01); *A63B 37/0075* (2013.01); *A63B 37/0076* (2013.01); *A63B 37/0092* (2013.01); *A63B 45/00* (2013.01); *C08K 3/041* (2017.05); *C08K 3/042* (2017.05); *C08K 3/22* (2013.01); *C08K 5/098* (2013.01); *C08K 5/14* (2013.01); *C08L 9/00* (2013.01); *C08K 2003/2296* (2013.01); *C08K 2201/006* (2013.01)

(58) Field of Classification Search
CPC .................................................. A63B 37/0051
USPC ........................................................ 473/351
See application file for complete search history.

(56) References Cited

U.S. PATENT DOCUMENTS

2016/0279482 A1* 9/2016 DuFaux ............. A63B 37/0054

* cited by examiner

*Primary Examiner* — Raeann Gorden
(74) *Attorney, Agent, or Firm* — Michael A. Catania; Sonia Lari; Rebecca Hanovice

(57) ABSTRACT

A method for forming a golf ball core with a nanofiller masterbatch is disclosed herein. The method includes mixing the nanofiller masterbatch, a graphene masterbatch material with other materials to form a core mixture, wherein the masterbatch preferably comprises 1-80% by weight of nanofillers and 20-99% by weight of a carrier polymer.

3 Claims, 13 Drawing Sheets

Related U.S. Application Data

(60) Provisional application No. 62/401,034, filed on Sep. 28, 2016, provisional application No. 62/943,415, filed on Dec. 4, 2019.

PROCESS FOR INCORPORATING NANOFILLER MASTERBATCH INTO A CORE OF A GOLF BALL

CROSS REFERENCES TO RELATED APPLICATIONS

The Present Application is a continuation application of U.S. patent application Ser. No. 17/110,661, filed on Dec. 3, 2020, which claims priority to U.S. Provisional Patent Application No. 62/943,415, filed on Dec. 4, 2019, and is a continuation-in-part application of U.S. patent application Ser. No. 17/090,754, filed on Nov. 5, 2020, which is a continuation application of U.S. patent application Ser. No. 16/703,728, filed on Dec. 4, 2019, now U.S. patent Ser. No. 10/828,535, issued on Nov. 10, 2020, which is a continuation application of U.S. patent application Ser. No. 16/403,203, filed on May 3, 2019, now U.S. patent Ser. No. 10/500,446, issued on Dec. 10, 2019, which is a continuation application of U.S. patent application Ser. No. 16/105,125, filed on Aug. 20, 2018, now U.S. patent Ser. No. 10/279,220, issued on May 7, 2019, which is a continuation application of U.S. patent application Ser. No. 15/782,666, filed on Oct. 12, 2017, now U.S. patent Ser. No. 10/052,524, issued on Aug. 21, 2018, which is a continuation-in-part application of U.S. patent application Ser. No. 15/705,011, filed on Sep. 14, 2017, now U.S. patent Ser. No. 10/039,959, issued on Aug. 7, 2018, which is a continuation-in-part application of U.S. patent application Ser. No. 15/436,169, filed on Feb. 17, 2017, now U.S. Pat. No. 9,789,366, issued on Oct. 17, 2017, which claims priority to U.S. Provisional Patent Application No. 62/401,034, filed on Sep. 28, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to the use of a nanofiller masterbatch in a core of a golf ball.

Description of the Related Art

Typical golf ball cores are made from polybutadiene and polyisoprene based rubber. Crosslinking of this rubber is necessary to achieve certain hardness and speed. Common additives or reactive ingredients (henceforth will be called nanofillers) used for crosslinking include but are not limited to zinc acrylate, zinc diacrylate, zinc methacrylate, zinc dimethacrylate, zinc oxide, barium sulfate, calcium carbonate, graphene, carbon nanotubes (CNT) and carbon black. These ingredients are mixed in dry form along with rubber in a typical internal mixer. Optionally, more mixing is done using two-roll mill. With this process, there is a limit to how fast a certain core can get at a given hardness. Peroxide and or sulfur based compounds are added to this mixture to initiate crosslinking process.

The purpose of this invention is to enhance the durability, speed, spin characteristics, and aerodynamics of a golf ball without affecting its hardness. Usually, there is a direct correlation between core hardness and speed. Harder cores are faster but don't have the same feel that's associated with softer cores. This problem can be solved by creating a blend of reactive ingredients before they are introduced in an internal mixer. For example, first a masterbatch of nanofillers can be made using polybutadiene and or polyisoprene as a carrier. This masterbatch is then blended with other ingredients in an internal mixer. This approach improves the quality of nanofiller dispersion in a rubber matrix.

Most methods mentioned in the literature use chemical functionalization, ultrasonication or solvents for dispersing nanofillers in a polymer matrix. For example, U.S. Pat. No. 6,566,463 B1 (2001) describes a solvent based method in which multiple acids are reacted with metal oxides at a given temperature. Once the reaction is complete, the mixture is dried, ground before being used in a typical rubber core recipe. This method requires significant quantity of solvents, multiple drying, and milling steps.

BRIEF SUMMARY OF THE INVENTION

The present invention preferably requires no organic solvent or acid, and preferably requires no milling or drying steps. Once a masterbatch is made, no further purification or filtration steps are required for manufacture of the core of a golf ball.

An objective of the present invention is to enhance the durability, speed, spin characteristics and aerodynamics of a golf ball by modifying golf ball core with nanofillers such as zinc acrylate, zinc diacrylate, zinc methacrylate, zinc diacrylate, zinc oxide, and barium sulfate, graphene, carbon nanotubes (CNT), or carbon black. Good dispersion of nanofillers in the core is achieved by using it in a masterbatch form and not in a powder form. Carrier polymers used in the masterbatch include but are not limited to polybutadiene, polyisoprene, polyisobutylene, EPDM, polyethylene ionomer, maleic anhydride functionalized polyethylene, styrene butadiene rubber, styrene isoprene rubber, and butyl rubber.

With this approach nanofillers are well dispersed before introduction into a rubber mixture Better nanofiller and polymer interaction leads to better crosslinking, speed, spin characteristics, and durability of cores without significantly affecting hardness. One aspect of the present invention is a golf ball comprising a core and cover. The core is formed from the reaction of a core mixture comprising a first masterbatch, a graphene masterbatch, barium sulfate, a peroxide and zinc bis(pentachlorothiophenolate). The first masterbatch ranges from 50 to 90 weight percent of the core mixture. The graphene masterbatch ranges 1 to 10 weight percent of the core mixture. The barium sulfate ranges 1 to 5 weight percent of the core mixture. The peroxide ranges 0.2 to 1 weight percent of the core mixture. The zinc bis(pentachlorothiophenolate) ranges 0.2 to 1 weight percent of the core mixture.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
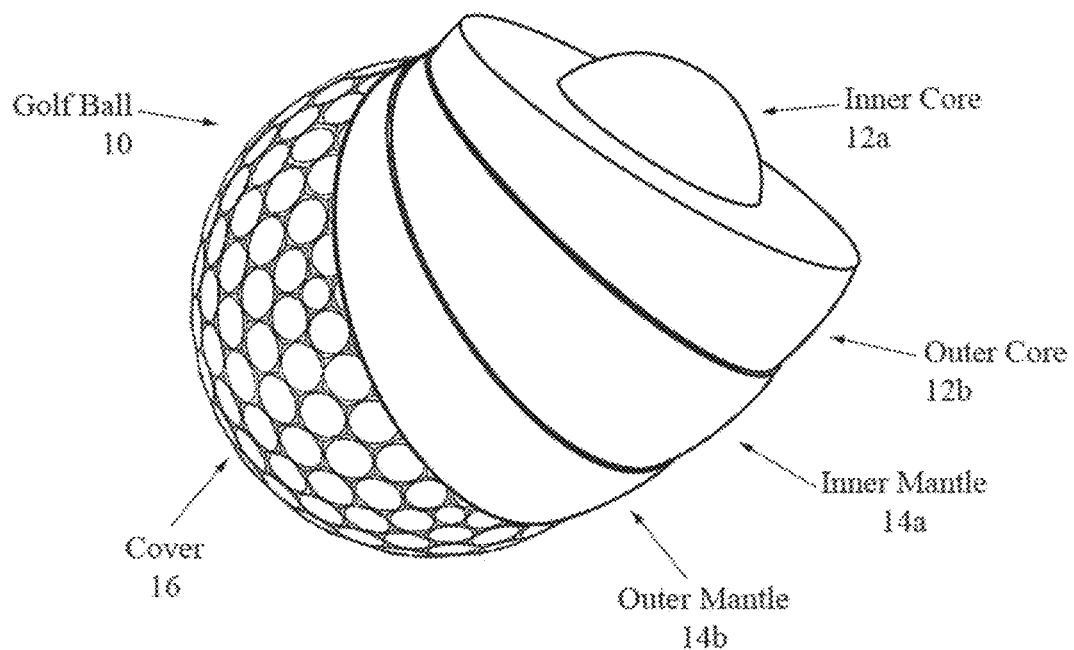
FIG. 1 is an exploded partial cut-away view of a golf ball.
Figure 2:
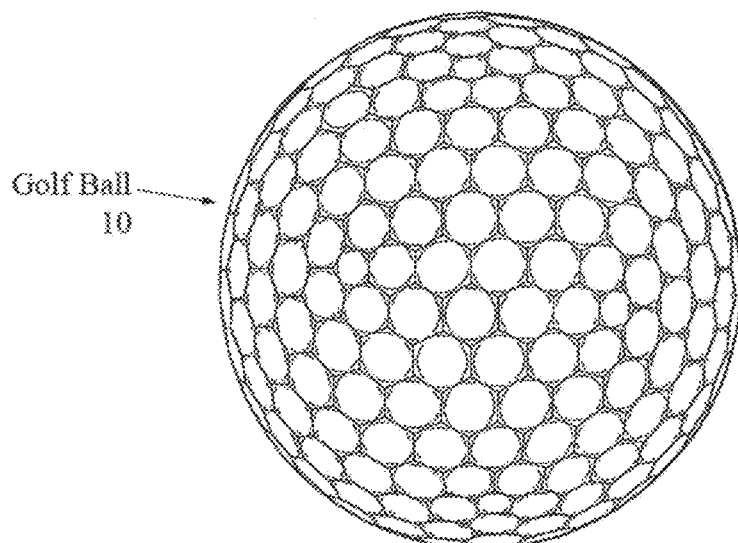
FIG. 2 is top perspective view of a golf ball.
Figure 3:
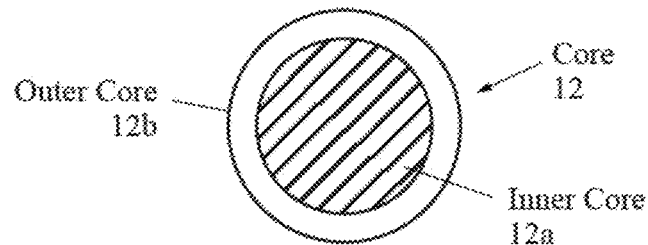
FIG. 3 is a cross-sectional view of a core component of a golf ball.
Figure 4:
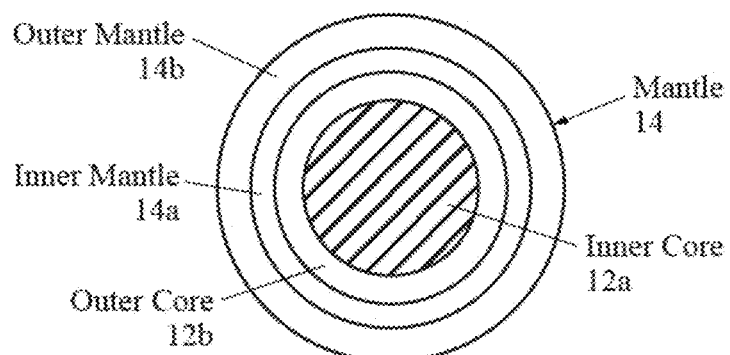
FIG. 4 is a cross-sectional view of a core component and a mantle component of a golf ball.

Rubber based cores were made as per recipe mentioned in Table Zero. Masterbatches were mixed in an internal mixer. A typical graphene masterbatch has a loading of 0.2-30% graphene in rubber such as polybutadiene and or polyisoprene. A zinc diacrylate (ZDA) and zinc oxide masterbatch is made in a similar manner with a loading between 1-80% in rubber such as polybutadiene and or polyisoprene. For control cores, ZDA and zinc oxide were used in a powder form. For prototype cores, ZDA and zinc oxide were used in a masterbatch form with polybutadiene as a carrier polymer.

Cores were compression molded at temperatures ranging between 150-400 F for times ranging from 1-30 minutes. Compression was measured by applying a 200 pound load to the core and measuring its deflection, in inches. Compression=180−(deflection*1000).

Carrier polymers used in masterbatch include, but are not limited to, polybutadiene, polyisoprene, polyisobutylene, EPDM, polyethylene ionomer, maleic anhydride functionalized polyethylene, styrene butadiene rubber, styrene isoprene rubber, and butyl rubber.

The masterbatch is preferably made by mixing a polymer and graphene or/and carbon nanotube in an internal mixer and then optionally additional mixing is done on a two roll mill.

The masterbatch is preferably added to a typical golf core recipe at 1-90% by weight.

The dispersion of nanofillers such as graphene or and carbon nanotubes in a rubber core is improved by using a masterbatch of these fillers. Nanofillers by themselves have a tendency to form aggregates. Using a masterbatch helps disperse the polymer between layers/tubes of nanofillers which facilitates their further incorporation in a rubber core.

Better dispersion is obtained since these nanofillers get mixed twice (once during masterbatch process and a second during golf ball core mixing process).

This process prevents dust formation since nanofiller is added in a masterbatch form and not in a powder form.

This process is environmentally friendly since it does not use any strong solvent, any strong oxidizing or reducing agents for modifying or dispersing graphene No post or pre-treatment of graphene is needed for its dispersion in a polymer matrix No ultra-sonication of graphene is required.

TABLE ZERO

|  | Control (% by weight) | Prototype (% by weight) |
| --- | --- | --- |
| Polybutadiene rubber | 50.42 | 0.00 |
| Zinc diacrylate (powder) | 32.78 | 0.00 |
| Zinc oxide (powder) | 5.26 | 0.00 |
| 1,1-bis(t-butyl peroxy)-3,3,5 tri-methylcyclohexane | 0.45 | 0.45 |
| Zinc bis(pentachlorothiophenolate) | 0.52 | 0.52 |
| Color | 0.68 | 0.68 |
| BaSO4 | 2.26 | 2.26 |
| Graphene Masterbatch | 7.63 | 7.63 |
| ZDA ZnO Masterbatch (5.9% Zinc oxide, 37.1% ZDA, 57.0% polybutadiene) | 0.00 | 88.46 |
| Total | 100.00 | 100.00 |
| Physical properties | | |
| Compression | 111.9 | 112.3 |
| COR | 0.795 | 0.799 |
| Density (g/cc) | 1.165 | 1.165 |

As seen in Table 1, a prototype with the same nanofiller loading shows higher speed (COR—coefficient of restitution) without affecting hardness of core.

Polybutadiene based cores were made using following materials. Corresponding levels (by % wt) is mentioned next to each material: Polybutadiene with more than 60% 1,4-cis structure—(40-90%); Polyisoprene—(1-30%); Zinc diacrylate—(10-50%); Zinc oxide—(1-30%); Zinc stearate—(1-20%); Peroxide initiator—(0.1-10%); Zinc pentachlorothiophenol—(0-10%); Color—(0-10%); Barium sulfate—(0-20%); Graphene—(0.01-6%)—available from various suppliers such as Cheap Tubes Inc., Ad-Nano Technologies Private Limited, MKnano, XG Sciences Inc., Angstron Materials Inc.; Graphene masterbatch (a masterbatch with 5-95% polybutadiene or polyisoprene and 1-10% graphene)—(0.1-50%)—custom compounding can be done with the help of various suppliers such as Preferred Compounding Corp, Dyna-Mix, Alttran, Callaway (in house compounding; CNT—(0.01-6%)—available from various suppliers such as Bayer Material Science, Future Carbon, Cheap Tubes Inc, NanoAmor, Nanocyl, Nanocyl SA, Arkema, NanoTechLabs, Inc.; CNT masterbatch (a masterbatch of with 5-95% polyisoprene and 1-95% CNT)—(01-50%)—masterbatches or custom masterbatches are available from various suppliers such as Cheap Tubes Inc, Nanocyl SA, Arkema, NanoTechLabs, Inc.

Dual Cores with Graphene/CNT in the Outer Core.

In this study graphene, CNT, and a mixture of graphene and CNT were introduced to the outer core in a dual core construction. Dual cores were made by compression molding two outer core halves around an already molded inner core having a diameter of approximately 0.940" and a soft compression of approximately 0.210 inches of deflection under a 200 lb load. Curing of the inner and outer core was done at temperatures ranging between 150-400 F for times ranging from 1-30 minutes. After molding, the dual cores were spherically ground to approximately 1.560" prior to testing.

Table 1 and 2 give details of recipe of inner and outer cores. Components from these recipes were mixed in an internal mixer. Optionally, additional mixing was done using a two roll mill.

Compression of the outer core is measured by first making a full size core separately, measuring its compression, and then molding two halves around the inner core to complete the dual core. Compression differential describes the difference between the outer core compression (as molded independently) and inner core compression. A higher compression differential is more susceptible to crack durability upon impact.

TABLE 1

Recipes for control and prototype cores

| | Control (% by weight) | Prototype (% by weight) |
|---|---|---|
| Polybutadiene rubber | 50.42 | 0.00 |
| Zinc diacrylate (powder) | 32.78 | 0.00 |
| Zinc oxide (powder) | 5.26 | 0.00 |
| 1,1-bis(t-butyl peroxy)-3,3,5 tri-methylcyclohexane | 0.45 | 0.45 |
| Zinc bis(pentachlorothiophenolate) | 0.52 | 0.52 |
| Color | 0.68 | 0.68 |
| BaSO4 | 2.26 | 2.26 |
| Graphene Masterbatch | 7.63 | 7.63 |
| ZDA ZnO Masterbatch (5.9% Zinc oxide, 37.1% ZDA, 57.0% polybutadiene) | 0.00 | 88.46 |
| Total | 100.00 | 100.00 |
| Physical properties | | |
| Compression | 111.9 | 112.3 |
| COR | 0.795 | 0.799 |
| Density (g/cc) | 1.165 | 1.165 |

As seen in Table 1, prototype with the same nanofiller loading shows higher speed (COR—coefficient of restitution) without affecting hardness of core.

TABLE 2

Outer core recipe of dual core

| Components | Formula 1 (0% Graphene) % wt | Formula 2 (0.8% Graphene) % wt | Formula 3 (0.8% CNT) % wt | Formula 4 (0.8% Graphene + CNT mixture) % wt |
|---|---|---|---|---|
| Polybutadiene | 63.3 | 62.5 | 62.5 | 62.5 |
| Zinc Diacrylate | 26.3 | 26.9 | 26.9 | 26.9 |
| Zinc Oxide | 6.3 | 5.9 | 5.9 | 5.9 |
| Zinc Stearate | 0.0 | 0.0 | 0.0 | 0.0 |
| Peroxide initiator | 0.5 | 0.5 | 0.5 | 0.5 |
| Zinc pentachlorothiophenol | 0.6 | 0.6 | 0.6 | 0.6 |
| Color | 0.1 | 0.1 | 0.1 | 0.1 |
| Limestone | 0.0 | 0.0 | 0.0 | 0.0 |
| Tungsten | 0.0 | 0.0 | 0.0 | 0.0 |
| Barium sulfate | 2.9 | 2.8 | 2.8 | 2.8 |
| Graphene | 0.0 | 0.0 | 0.0 | 0.0 |
| Graphene in masterbatch | 0.0 | 0.8 | 0.0 | 0.4 |
| CNT | 0.0 | 0.0 | 0.0 | 0.0 |
| CNT added in masterbatch form | 0.0 | 0.0 | 0.8 | 0.4 |
| Properties of outer core | | | | |
| Compression | 100.7 | 101.2 | 102.3 | 102.2 |
| COR (coefficient of restitution) | 0.816 | 0.809 | 0.806 | 0.808 |
| Properties of dual core built from inner and outer core | | | | |
| Compression | 81.3 | 82.7 | 86.3 | 85.1 |
| COR (coefficient of restitution @125 fps) | 0.812 | 0.808 | 0.808 | 0.809 |
| Durability score or mean time to fail MTTF(number of shots after which ball starts to crack/fail) | 21 | 62 | 73 | 65 |

Compression is measured by applying a 200 pound load to the core and measuring its deflection, in inches. Compression=180−(deflection*1000)

Durability Testing of Dual Cores

Cores were shot at 175 fps in a pneumatic testing machine (PTM).

For each formula mentioned in Table 2, 12 cores were tested. Number of shots after which each core cracked was recorded for each core, and the cracked core was removed from the remainder of the test. The data was reported using a Weibull plot, and the mean time to fail was reported as shown in Table 2. As seen in FIG. 1, graphene/CNT modified cores endured more shots before failure compared to cores with no graphene/CNT. It is reasonable to assume that the durability of a golf ball having a dual core of this design will also experience a dramatic increase in crack durability based on this improvement to the dual core. It is reasonable to assume that the addition of graphene/CNT in the inner core could provide a durability enhancement to the overall golf ball, but this study only focused on the outer core.

As our experiment has shown, incorporating graphene and CNT into the outer core recipe reinforces the strength of the outer core and provides greater crack durability protection in the design of a dual core golf ball, which is more susceptible to crack durability failures if the outer core is much firmer than the soft inner core.

FIGS. 1, 3, 4 and 5 illustrate a five piece golf ball 10 comprising an inner core 12a, an outer core 12b, an inner mantle 14a, an outer mantle 14b, and a cover 16, wherein the cover layer 16 is composed of a thermoplastic polyurethane and has a Shore A hardness less than 90. The inner core 12a comprises polybutadiene mixture comprising 0.4 to 2.5 weight percent of a graphene.

Figure 5:
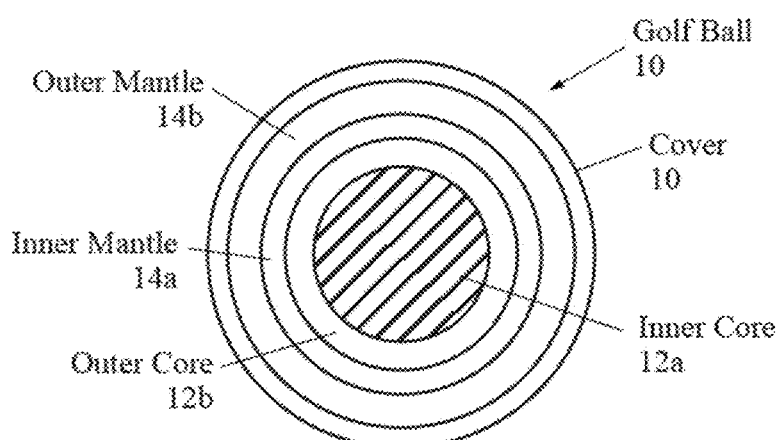
FIG. 5 is a cross-sectional view of an inner core layer, an outer core layer, an inner mantle layer, an outer mantle layer and a cover layer of a golf ball.
Figure 5A:
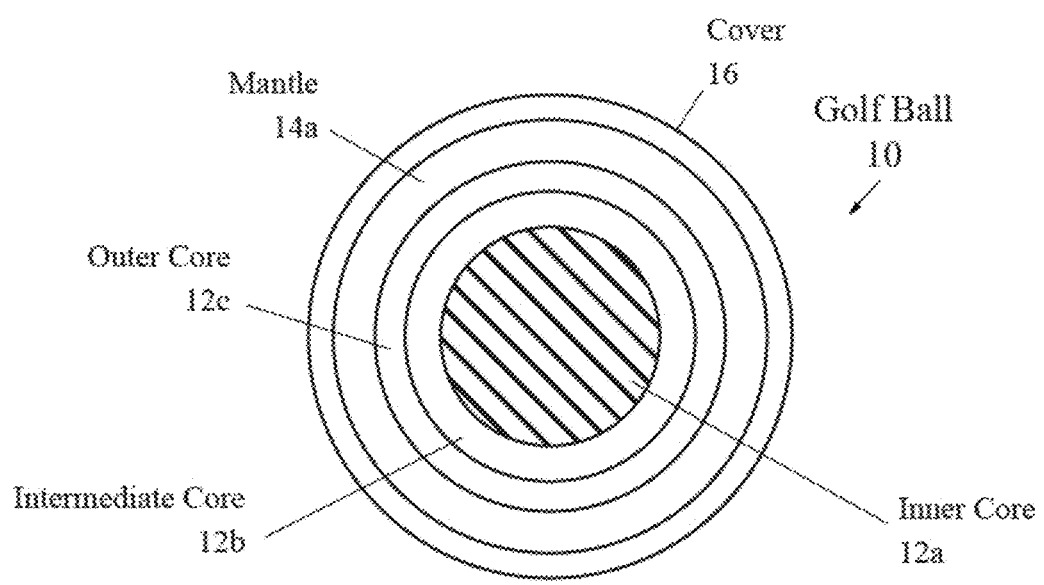
FIG. 5A is a cross-sectional view of an inner core layer, an intermediate core layer, an outer core layer, a mantle layer and a cover layer of a golf ball.

FIG. 5A illustrates a five piece golf ball 10 comprising an inner core 12a, an intermediate core 12b, an outer core 12c, a mantle 14, and a cover 16, wherein the cover layer 16 is composed of a thermoplastic polyurethane. The intermediate core 12b comprises polybutadiene mixture comprising 0.4 to 2.5 weight percent of a graphene.

Figure 8:
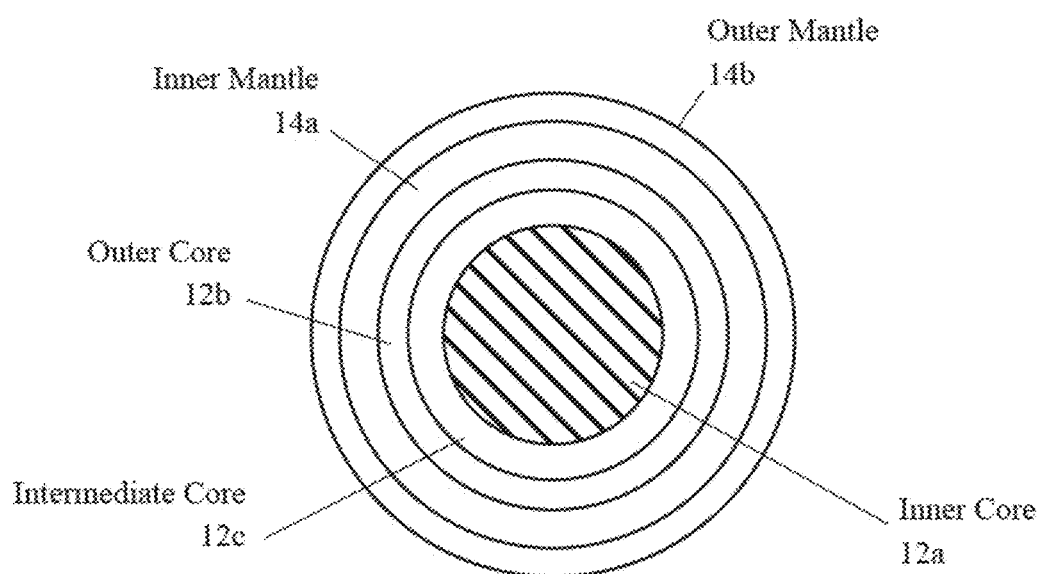
FIG. 8 is a cross-sectional view of a core component and a mantle component of a golf ball.
Figure 9:
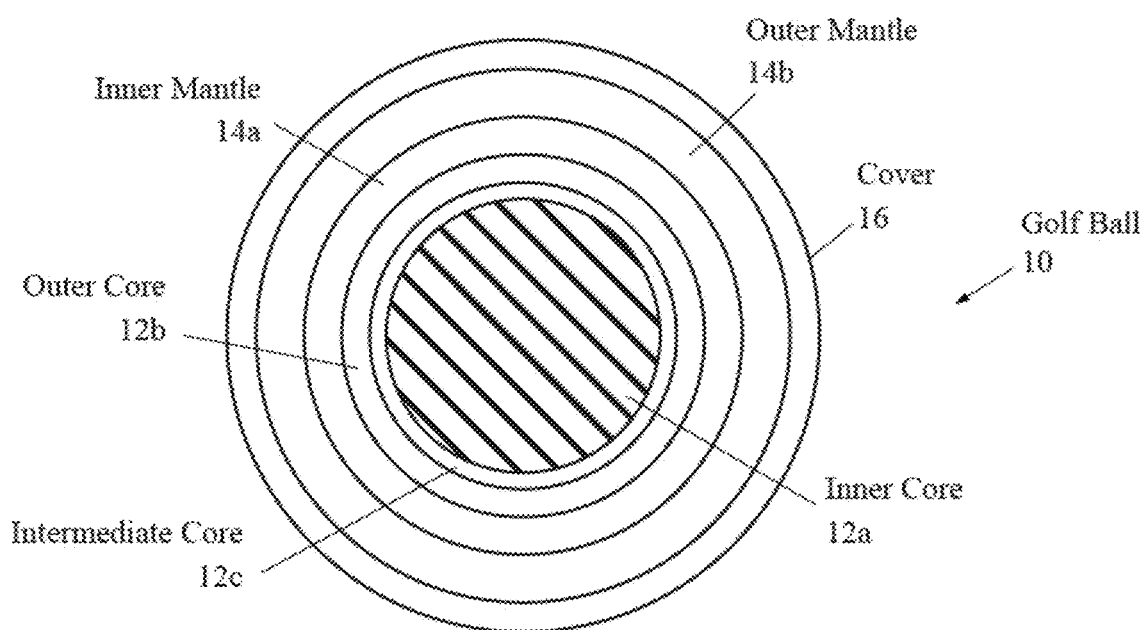
FIG. 9 is a cross-sectional view of a core component, the mantle component and a cover layer of a golf ball.

FIGS. 8 and 9 illustrate a six piece golf ball 10 comprising an inner core 12a, an intermediate core 12b, an outer core 12c, an inner mantle 14a, an outer mantle 14b, and a cover 16, wherein the cover layer 16 is composed of a thermoplastic polyurethane. The inner core 12a comprises polybutadiene mixture comprising 0.4 to 2.5 weight percent of a graphene.

Figure 10:
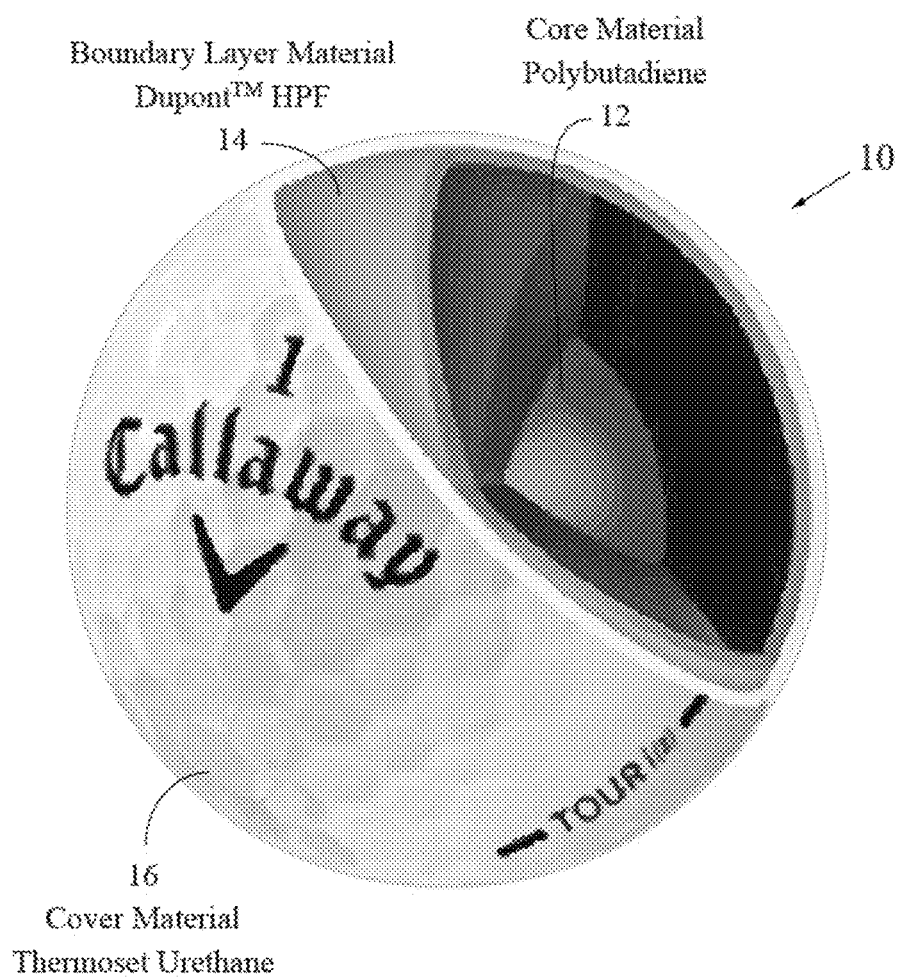
FIG. 10 is an exploded partial cut-away view of a four-piece golf ball.

FIG. 10 illustrates a four piece golf ball comprising a dual core, a boundary layer and a cover. The outer core comprises polybutadiene mixture comprising 0.4 to 2.5 weight percent of a graphene.

Figure 11:
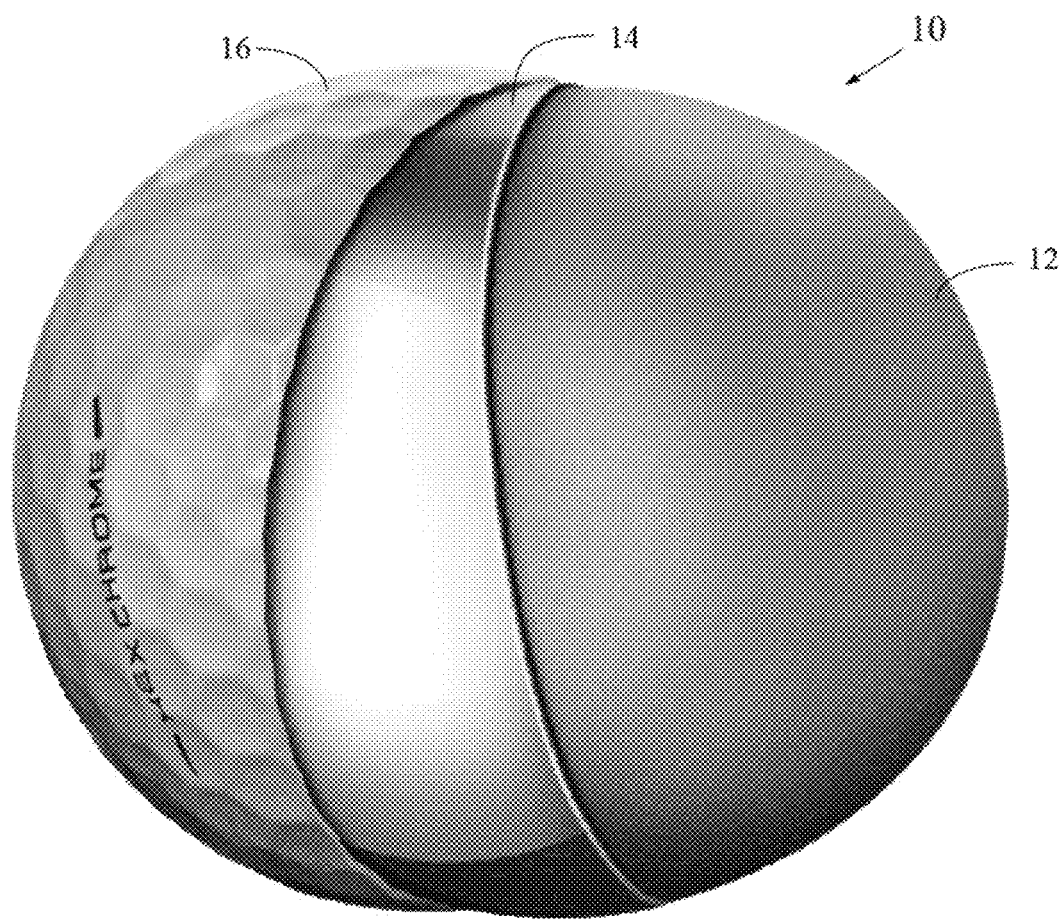
FIG. 11 is an exploded partial cut-away view of a three-piece golf ball.

FIG. 11 illustrates a three piece golf ball comprising a core, a boundary layer and a cover. The core comprises polybutadiene mixture comprising 0.4 to 2.5 weight percent of a graphene.

Figure 12:
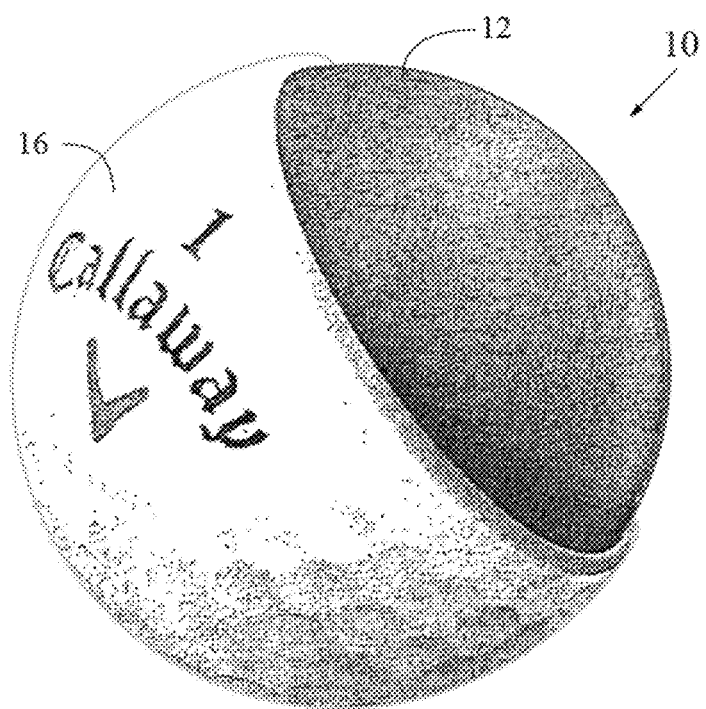
FIG. 12 is an exploded partial cut-away view of a two-piece golf ball.
Figure 13:
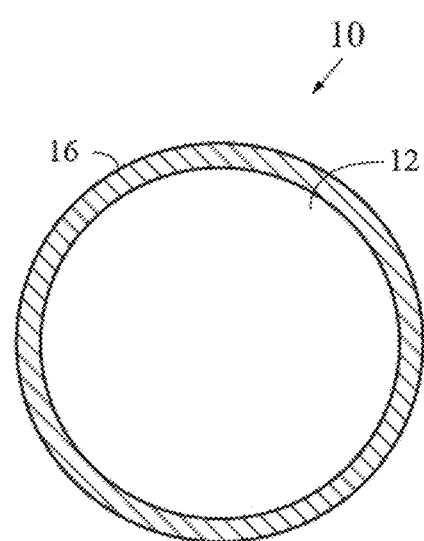
FIG. 13 is a cross-sectional view of a two-piece golf ball.

FIGS. 12 and 13 illustrate a two piece golf ball 20 with a core 25 and a cover 30. The core comprises polybutadiene mixture comprising 0.4 to 2.5 weight percent of a graphene.

Figure 14:
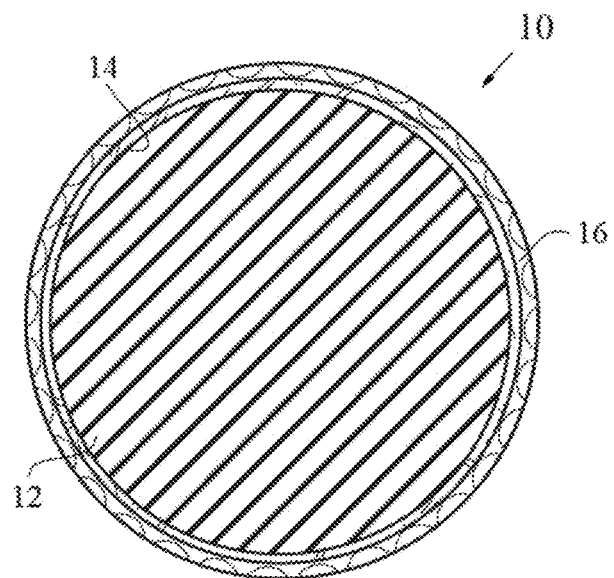
FIG. 14 is a cross-sectional view of a three-piece golf ball.
Figure 15:
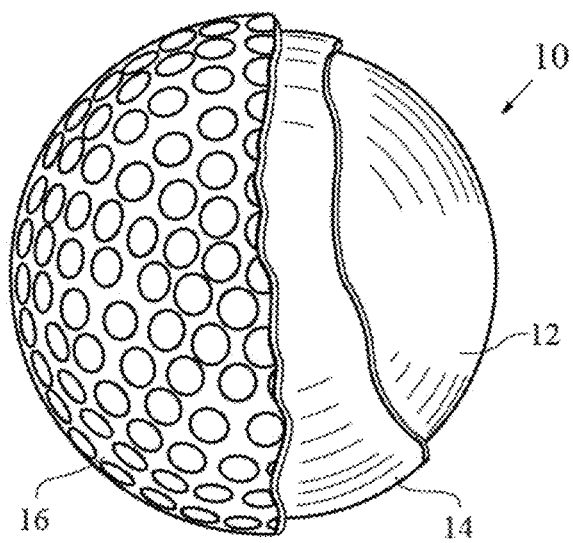
FIG. 15 is an exploded partial cut-away view of a three-piece golf ball.

FIGS. 14 and 15 illustrate a three-piece golf ball 5 comprising a core 10, a mantle layer 14 and a cover 16 with dimples 18, wherein the core comprises 0.4 to 2.5 weight percent of a graphene.

Figure 16:
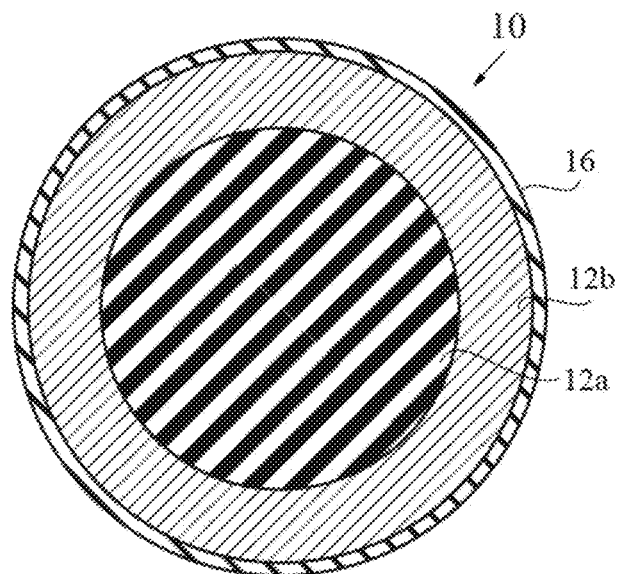
FIG. 16 is a cross-sectional view of a three-piece golf ball with a dual core and a cover.

FIG. 16 illustrates a dual core three piece golf ball 35 comprising an inner core 30, and outer core 32 and a cover 34, wherein the core comprises 0.4 to 2.5 weight percent of a graphene.

Figure 17:
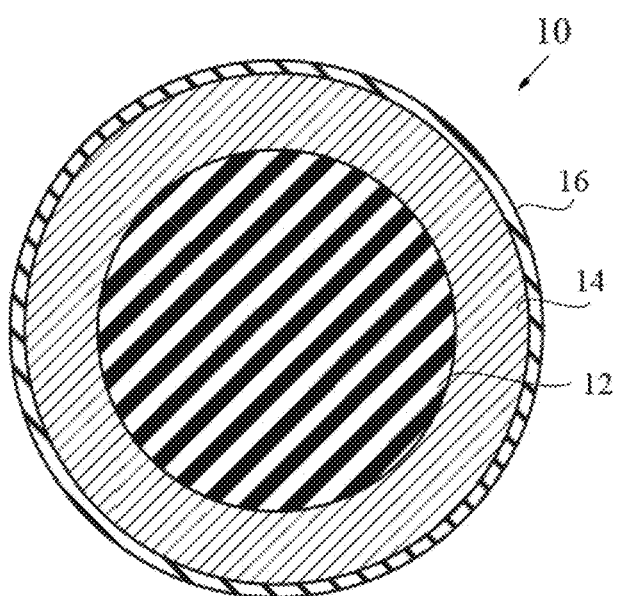
FIG. 17 is a cross-sectional view of a three-piece golf ball with a core, mantle and cover.

FIG. 17 illustrates a three piece golf ball 45 comprising a core 40, a mantle layer 42 and a cover 44, wherein the core comprises 0.4 to 2.5 weight percent of a graphene.

Figure 18:
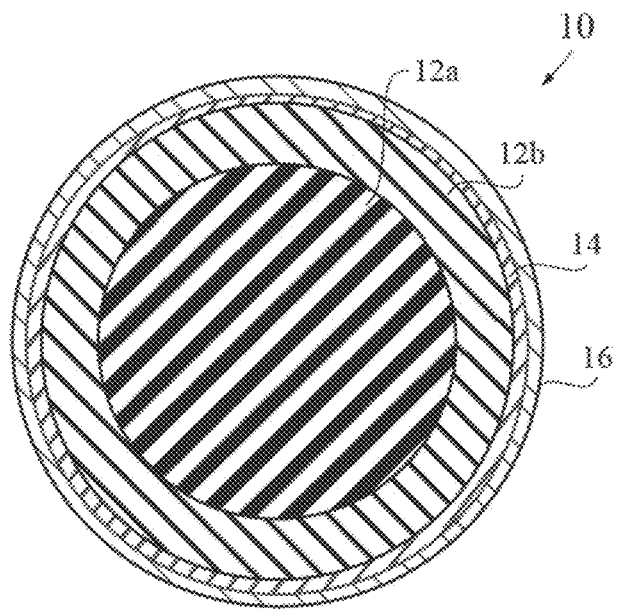
FIG. 18 is a cross-sectional view of a four-piece golf ball with a dual core, mantle layer and a cover.

FIG. 18 illustrates a dual core four piece golf ball 55 comprising an inner core 50, an outer core 52, a mantle layer 54 and a cover 56, wherein the core comprises 0.4 to 2.5 weight percent of a graphene.

Figure 19:
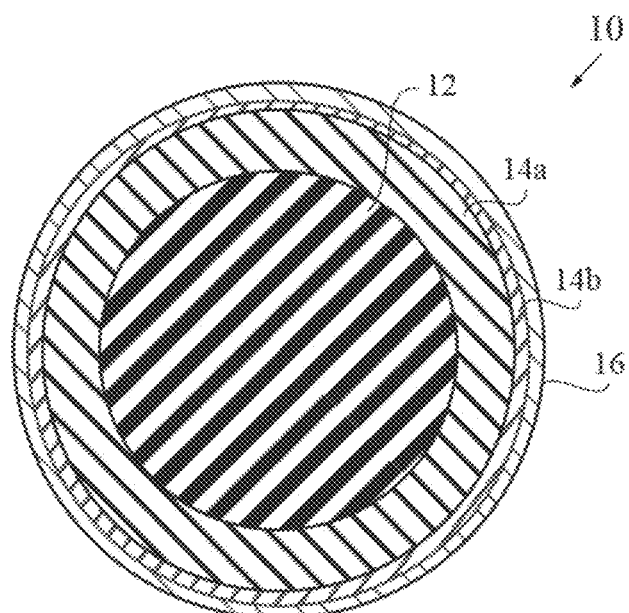
FIG. 19 is a cross-sectional view of a four-piece golf ball with a core, dual mantle layers and a cover.

FIG. 19 illustrates a four piece golf ball 65 comprising a core 60, an inner mantle 62, an outer mantle 64 and a cover 66, wherein the core comprises 0.4 to 2.5 weight percent of a graphene.

The mantle component is preferably composed of the inner mantle layer and the outer mantle layer. The mantle component preferably has a thickness ranging from 0.05 inch to 0.15 inch, and more preferably from 0.06 inch to 0.08 inch. The outer mantle layer is preferably composed of a blend of ionomer materials. One preferred embodiment comprises SURLYN 9150 material, SURLYN 8940 material, a SURLYN AD1022 material, and a masterbatch. The SURLYN 9150 material is preferably present in an amount ranging from 20 to 45 weight percent of the cover, and more preferably 30 to 40 weight percent. The SURLYN 8945 is preferably present in an amount ranging from 15 to 35 weight percent of the cover, more preferably 20 to 30 weight percent, and most preferably 26 weight percent. The SURLYN 9945 is preferably present in an amount ranging from 30 to 50 weight percent of the cover, more preferably 35 to 45 weight percent, and most preferably 41 weight percent. The SURLYN 8940 is preferably present in an amount ranging from 5 to 15 weight percent of the cover, more preferably 7 to 12 weight percent, and most preferably 10 weight percent.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The inner mantle layer is preferably composed of a blend of ionomers, preferably comprising a terpolymer and at least two high acid (greater than 18 weight percent) ionomers neutralized with sodium, zinc, magnesium, or other metal ions. The material for the inner mantle layer preferably has a Shore D plaque hardness ranging preferably from 35 to 77, more preferably from 36 to 44, a most preferably approximately 40. The thickness of the outer mantle layer preferably ranges from 0.025 inch to 0.050 inch, and is more preferably approximately 0.037 inch. The mass of an insert including the dual core and the inner mantle layer preferably ranges from 32 grams to 40 grams, more preferably from 34 to 38 grams, and is most preferably approximately 36 grams. The inner mantle layer is alternatively composed of a HPF material available from DuPont. Alternatively, the inner mantle layer 14b is composed of a material such as disclosed in Kennedy, III et al., U.S. Pat. No. 7,361,101 for a Golf Ball And Thermoplastic Material, which is hereby incorporated by reference in its entirety.

The outer mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. The material of the outer mantle layer preferably has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. The mass of the entire insert including the core, the inner mantle layer and the outer mantle layer preferably ranges from 38 grams to 43 grams, more preferably from 39 to 41 grams, and is most preferably approximately 41 grams.

In an alternative embodiment, the inner mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. In this embodiment, the material of the inner mantle layer has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. Also in this embodiment, the outer mantle layer 14b is composed of a blend of ionomers, preferably comprising a terpolymer and at least two high acid (greater than 18 weight percent) ionomers neutralized with sodium, zinc, magnesium, or other metal ions. In this embodiment, the material for the outer mantle layer 14b preferably has a Shore D plaque hardness ranging preferably from 35 to 77, more preferably from 36 to 44, a most preferably approximately 40. The thickness of the outer mantle layer preferably ranges from 0.025 inch to 0.100 inch, and more preferably ranges from 0.070 inch to 0.090 inch.

In yet another embodiment wherein the inner mantle layer is thicker than the outer mantle layer and the outer mantle layer is harder than the inner mantle layer, the inner mantle layer is composed of a blend of ionomers, preferably comprising a terpolymer and at least two high acid (greater than 18 weight percent) ionomers neutralized with sodium, zinc, magnesium, or other metal ions. In this embodiment, the material for the inner mantle layer has a Shore D plaque hardness ranging preferably from 30 to 77, more preferably from 30 to 50, and most preferably approximately 40. In this embodiment, the material for the outer mantle layer has a Shore D plaque hardness ranging preferably from 40 to 77, more preferably from 50 to 71, and most preferably approximately 67. In this embodiment, the thickness of the inner mantle layer preferably ranges from 0.030 inch to 0.090 inch, and the thickness of the outer mantle layer ranges from 0.025 inch to 0.070 inch.

Preferably the inner core has a diameter ranging from 0.75 inch to 1.20 inches, more preferably from 0.85 inch to 1.05 inch, and most preferably approximately 0.95 inch. Preferably the inner core 12a has a Shore D hardness ranging from 20 to 50, more preferably from 25 to 40, and most preferably approximately 35. Preferably the inner core has a mass ranging from 5 grams to 15 grams, 7 grams to 10 grams and most preferably approximately 8 grams.

Preferably the outer core has a diameter ranging from 1.25 inch to 1.55 inch, more preferably from 1.40 inch to 1.5 inch, and most preferably approximately 1.5 inch. Preferably the outer core has a Shore D surface hardness ranging from 40 to 65, more preferably from 50 to 60, and most preferably approximately 56. Preferably the outer core is formed from a polybutadiene, zinc diacrylate, zinc oxide, zinc stearate, a peptizer and peroxide. Preferably the combined inner core and outer core have a mass ranging from 25 grams to 35 grams, 30 grams to 34 grams and most preferably approximately 32 grams.

Figure 6:
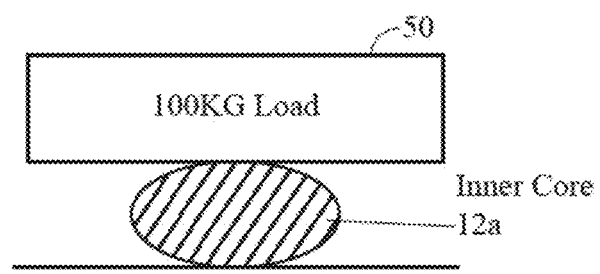
FIG. 6 is a cross-sectional view of an inner core layer under a 100 kilogram load.
Figure 7:
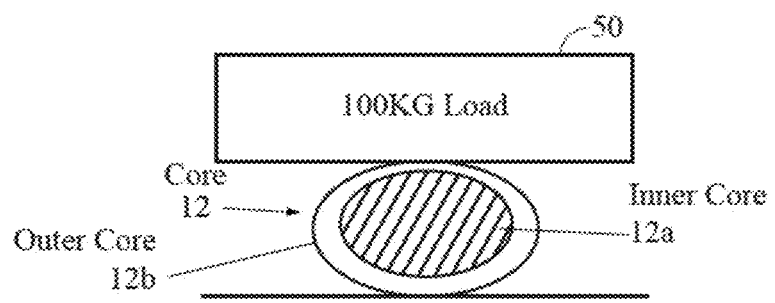
FIG. 7 is a cross-sectional view of a core under a 100 kilogram load.

Preferably the inner core has a deflection of at least 0.230 inch under a load of 220 pounds, and the core has a deflection of at least 0.080 inch under a load of 200 pounds. As shown in FIGS. 6 and 7, a mass 50 is loaded onto an inner core and a core. As shown in FIGS. 6 and 7, the mass is 100 kilograms, approximately 220 pounds. Under a load of 100 kilograms, the inner core preferably has a deflection from 0.230 inch to 0.300 inch. Under a load of 100 kilograms, preferably the core has a deflection of 0.08 inch to 0.150 inch. Alternatively, the load is 200 pounds (approximately 90 kilograms), and the deflection of the core 12 is at least 0.080 inch. Further, a compressive deformation from a beginning load of 10 kilograms to an ending load of 130 kilograms for the inner core ranges from 4 millimeters to 7 millimeters and more preferably from 5 millimeters to 6.5 millimeters. The dual core deflection differential allows for low spin off the tee to provide greater distance, and high spin on approach shots.

In an alternative embodiment of the golf ball shown in FIG. 5A, the golf ball 10 comprises an inner core 12a, an intermediate core 12b, an outer core 12b, a mantle 14 and a cover 16. The golf ball 10 preferably has a diameter of at least 1.68 inches, a mass ranging from 45 grams to 47 grams, a COR of at least 0.79, a deformation under a 100 kilogram loading of at least 0.07 mm.

In one embodiment, the golf ball comprises a core, a mantle layer and a cover layer. The core comprises an inner core sphere, an intermediate core layer and an outer core layer. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer. The mantle layer is disposed over the core, comprises an ionomer material and has a Shore D hardness greater than 55. The cover layer is disposed over the mantle layer comprises a thermoplastic polyurethane material and has a Shore A hardness less than 100. The golf ball has a diameter of at least 1.68 inches. The mantle layer is harder than the outer core layer, the outer core layer is harder than the intermediate core layer, the intermediate core layer is harder than the inner core sphere, and the cover layer is softer than the mantle layer.

In another embodiment, shown in FIGS. 8 and 9, the golf ball 10 has a multi-layer core and multi-layer mantle. The golf ball includes a core, a mantle component and a cover layer. The core comprises an inner core sphere, an intermediate core layer and an outer core layer. The inner core sphere comprises a TPEE material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer 12c. The inner mantle layer is disposed over the core, comprises an ionomer material and has a Shore D hardness greater than 55. The outer mantle layer is disposed over the inner mantle layer, comprises an ionomer material and has a Shore D hardness greater than 60. The cover layer is disposed over the mantle component, comprises a thermoplastic polyurethane material and has a Shore A hardness less than 100. The golf ball has a diameter of at least 1.68 inches. The outer mantle layer is harder than the inner mantle layer, the inner mantle layer is harder than the outer core layer, the outer core layer is harder than the intermediate core layer, the intermediate core layer is harder than the inner core sphere, and the cover layer is softer than the outer mantle layer.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Various aspects of the present invention golf balls have been described in terms of certain tests or measuring procedures. These are described in greater detail as follows.

As used herein, "Shore D hardness" of the golf ball layers is measured generally in accordance with ASTM D-2240 type D, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore D hardness of the cover is measured while the cover remains over the mantles and cores. When a hardness measurement is made on the golf ball, the Shore D hardness is preferably measured at a land area of the cover.

As used herein, "Shore A hardness" of a cover is measured generally in accordance with ASTM D-2240 type A, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore A hardness of the cover is measured while the cover remains over the mantles and cores. When a hardness measurement is made on the golf ball, Shore A hardness is preferably measured at a land area of the cover The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the COR and the surface configuration of the ball.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of ballistic screens, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The measurements for deflection, compression, hardness, and the like are preferably performed on a finished golf ball as opposed to performing the measurement on each layer during manufacturing.

Preferably, in a five layer golf ball comprising an inner core, an outer core, an inner mantle layer, an outer mantle layer and a cover, the hardness/compression of layers involve an inner core with the greatest deflection (lowest hardness), an outer core (combined with the inner core) with a deflection less than the inner core, an inner mantle layer with a hardness less than the hardness of the combined outer core and inner core, an outer mantle layer with the hardness layer of the golf ball, and a cover with a hardness less than the hardness of the outer mantle layer. These measurements are preferably made on a finished golf ball that has been torn down for the measurements.

Preferably the inner mantle layer is thicker than the outer mantle layer or the cover layer. The dual core and dual mantle golf ball creates an optimized velocity-initial velocity ratio (Vi/IV), and allows for spin manipulation. The dual core provides for increased core compression differential resulting in a high spin for short game shots and a low spin for driver shots. A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A golf ball comprising:
 a core formed from a reaction of core mixture comprising a first masterbatch ranging from 50 to 90 weight percent of the core mixture, a graphene masterbatch ranging 1 to 10 weight percent of the core mixture, barium sulfate ranging 1 to 5 weight percent of the core mixture, a peroxide ranging 0.2 to 1 weight percent of the core mixture, and zinc bis(pentachlorothiophenolate) ranging 0.2 to 1 weight percent of the core mixture; and
 a cover disposed over the core.

2. The golf ball according to claim 1 wherein the first masterbatch comprises 5.9% Zinc oxide, 37.1% ZDA, 57.0% polybutadiene.

3. The golf ball according to claim 1 wherein the first masterbatch comprises 1-10 weight percent zinc oxide, 30 to 50 weight percent zinc diacrylate, and 40 to 80 weight percent polybutadiene.

* * * * *